United States Patent
Megal et al.

(10) Patent No.: US 10,127,739 B2
(45) Date of Patent: Nov. 13, 2018

(54) SYSTEM FOR DETECTING ANGLE OF ARTICULATION ON AN ARTICULATING MINING MACHINE

(71) Applicant: Matrix Design Group LLC, Newburgh, IN (US)

(72) Inventors: Aaron Megal, Newburgh, IN (US); Ben Lemond, Newburgh, IN (US); Jason Kremer, Ft. Branch, IN (US)

(73) Assignee: Matrix Design Group, LLC, Newburgh, IN (US)

( * ) Notice: Subject to any disclaimer, the term of this patent is extended or adjusted under 35 U.S.C. 154(b) by 231 days.

(21) Appl. No.: 15/084,801

(22) Filed: Mar. 30, 2016

(65) Prior Publication Data
US 2016/0210797 A1    Jul. 21, 2016

Related U.S. Application Data (63) Continuation-in-part of application No. PCT/US2014/048118, filed on Jul. 25, 2014.

(51) Int. Cl.
*G07C 5/08* (2006.01)
*G05B 15/02* (2006.01)

(52) U.S. Cl.
CPC ......... *G07C 5/0808* (2013.01); *G05B 15/02* (2013.01); *G07C 5/0841* (2013.01)

(58) Field of Classification Search
CPC ..... G07C 5/0808; G07C 5/0841; G05B 15/02
USPC ....................................................... 701/34.4
See application file for complete search history.

(56) References Cited

U.S. PATENT DOCUMENTS

| | | | |
|---|---|---|---|
| 5,939,986 A | 8/1999 | Schiffbauer et al. | |
| 6,339,709 B1 | 1/2002 | Gladwin et al. | |
| 6,810,353 B2 | 10/2004 | Schiffbauer | |
| 7,420,471 B2 | 9/2008 | Frederick et al. | |
| 8,115,634 B2 | 2/2012 | Napolitano | |
| 8,289,170 B2 | 10/2012 | Pryor et al. | |
| 8,446,277 B2 | 5/2013 | Frederick | |
| 8,558,714 B1 | 10/2013 | Liff et al. | |
| 2009/0267787 A1 | 10/2009 | Pryor et al. | |
| 2012/0159604 A1 | 6/2012 | Bojivov et al. | |
| 2013/0038320 A1* | 2/2013 | Frederick | G01R 33/0206 324/207.13 |
| 2014/0002271 A1* | 1/2014 | Frederick | F16P 3/147 340/686.6 |
| 2014/0253708 A1 | 9/2014 | Allen et al. | |

(Continued)

*Primary Examiner* — Aaron L Troost
*Assistant Examiner* — Paula L Schneider
(74) *Attorney, Agent, or Firm* — Martin IP Law Group; C. Richard Martin (57) ABSTRACT

A system for detecting the angle of articulation at an articulating point between a first section and a second section of an articulating machine is provided. The system includes a controller positioned on the articulating machine for generating a uniquely encoded signal. A plurality of drivers are positioned on the second section of the articulating machine such that they are in communication with the controller for transmitting the uniquely encoded signal. A machine mounted locator is positioned on the first section of the articulating machine such that it is in communication with the drivers. An algorithm based on the uniquely encoded signal and a radio frequency signal generated by the machine mounted locator is performed at the controller to generate the uniquely encoded signal.

10 Claims, 10 Drawing Sheets

(56) References Cited

U.S. PATENT DOCUMENTS

2014/0266698 A1 9/2014 Hall et al.
2017/0226853 A1* 8/2017 Katrycz .................. E21C 35/24

* cited by examiner

FIG. 10

SYSTEM FOR DETECTING ANGLE OF ARTICULATION ON AN ARTICULATING MINING MACHINE

RELATED APPLICATIONS

This application is a continuation-in-part of PCT/US2014/048118 filed on Jul. 25, 2014, which was the international application of U.S. patent application Ser. No. 14/212,668 filed Mar. 14, 2014, which was the non-provisional application of U.S. Provisional Patent Application Ser. No. 61/792,530 filed Mar. 15, 2013.

BACKGROUND OF THE INVENTION

Field of the Invention

The present invention relates to a system and method for the detection of one or more locator units in the proximity of a transmitter system. More specifically, the present invention relates to a system that detects the proximity of a person or machine carrying the locator to a dangerous machine configured with the driver system, and determines the exact location of that person or machine and if that person or machine is close enough to be in danger. The system and method according to the present invention can also be used in a vehicle to vehicle collision avoidance setting where one or more drivers are positioned on a primary vehicle and a locator is positioned on each of one or more secondary vehicles. The proximity detection system and method of the present invention can be used on any mobile equipment, and is not intended to be limited to the mining industry.

Description of Prior Art

Industrial machines may be necessarily large and powerful. For example, continuous mining machines may be 40 feet long, 10-12 feet wide, 3-4 feet tall, and weigh 40 tons. Such machines have injured or killed people while being operated. For example, in "tramming," a continuous mining machine mounted on tracks is moved from one location to another in confined spaces at relatively high speeds and can turn or change directions fast enough to pin an operator against a rib (i.e., wall) of the mining space.

With respect to the environment, it may not be possible to set up traditional operator protection systems, such as light fences or guard rails, because the environment is generally unstructured (e.g., mining machines create the environment as they operate). Further, such environments are often noisy, dusty and wet.

A transducer, speaker or microphone that is exposed to such an environment is not likely to survive or function properly. For example, sonar and laser time-of-flight sensors exposed to such an environment will become dirty and non-operational very quickly. Further, such sensors have difficulty distinguishing between a person and other structural components in the environment, such as the wall of the mining space.

With respect to radio time-of-flight sensors, such as radar, while the components may be more durable in the environment the relatively short distances (e.g., two feet to 50 feet) between the operator and the machine make such sensors impractical and unreliable. Further, the requirement of a relatively large radio dish or directional radio antenna is impractical.

Alternatively, other systems utilize a magnetic field generator on the machine and a magnetic field sensor carried by the operator. The magnetic field generator creates a magnetic field around the machine. The magnetic field sensor senses the strength of the magnetic field and then relays the strength of the field by radio back to the machine. If the operator is determined to be too close to the machine, the machine is shut down. However, this system is limited to a substantially circular safety perimeter around the machine, so there is no ability to arbitrarily define a safety perimeter because there is no way to determine an exact location of the operator with respect to the machine. Thus, the safety perimeter must be set to a radius that includes a safety margin from the most distant points of concern of the machine, leaving areas that are safe inside of the safety perimeter. This becomes a nuisance because it prevents the operator from operating in areas that are safe and effective because of the lack of geometric control of the safety perimeter.

In the invention disclosed in U.S. Pat. No. 8,289,170, applicants herein invented a system that could determine the location of the operator with respect to the machine and, if necessary, shut the machine down without requiring any structure in the environment. That system included transmitters on the operators and a plurality of receiver units on the machine. One disadvantage of this system is that, because the transmitters are on the operators, not the machine, power and range are necessarily limited.

Thus, what is needed is a system for determining the location of the operator with respect to the machine wherein an encoded signal of greater power can be transmitted to increase the area in which an operator can be detected. Further, there is needed a system where the range and shape of the encoded signal can be customized and modified to suit the particular needs of the machinery being used. Advantageously, with such a system, the operator will learn to maintain a safe distance from the machine to be efficient in their job.

SUMMARY OF THE INVENTION

The present invention is a system for detecting the angle of articulation at an articulating point between a first section and a second section of an articulating machine. According to one aspect of the system of the present invention includes a controller positioned on the articulating machine for generating a uniquely encoded signal. A plurality of drivers is positioned on the second section of the articulating machine such that they are in communication with the controller for transmitting the uniquely encoded signal. A machine mounted locator is positioned on the first section of the articulating machine such that it is in communication with the drivers. The uniquely encoded signal is a magnetic signal according to one aspect of the present invention.

Means for determining the angle of articulation between the first section and second section of the articulating machine at the articulating point are also provided according to this aspect of the invention. According to a further aspect of the invention, the means for determining the angle of articulation includes an algorithm performed at the controller based on the uniquely encoded signal and a radio frequency signal generated by the machine mounted locator.

The system may further include one or more drivers positioned on the first section of the articulating machine. Those drivers are in communication with the controller for transmitting the uniquely encoded signal.

According to a further aspect of the invention, means for defining one or more safety zones around the articulating machine may be provided. The one or more safety zones may comprise a first warning boundary zone and a second operation limiting boundary zone. Means for dynamically altering the one or more safety zones are provided according to another aspect of the invention. The one or more safety zones may be dynamically altered depending upon the detected articulation angle.

According to yet a further aspect of the invention, a digital radio transceiver may be located in the controller, which also generates a driver radio frequency signal. The digital radio transceiver transmits the driver radio frequency signal. According to this aspect of the invention, the encoded signal is a uniquely encoded magnetic signal and the machine mounted locator comprises a locator microcontroller for processing data and controlling locator functions, one or more magnetic proximity signal receiving coils in communication with the locator microprocessor for receiving the uniquely encoded magnetic signal, and a digital radio transceiver in communication with the locator microcontroller for receiving the driver magnetic frequency signal and transmitting a locator radio frequency signal. The one or more magnetic proximity receiving coils may include a first magnetic proximity signal receiving coil; a second magnetic proximity signal receiving coil oriented orthogonally to the first magnetic proximity signal receiving coil; and a third magnetic proximity signal receiving coil oriented orthogonally to the first magnetic proximity signal receiving coil and to the second magnetic proximity signal receiving coil.

Another aspect of the present invention is a system for diagnosing errors and defects of components of a machine and detecting and diagnosing environmental conditions in a hazardous workspace surrounding the machine. That diagnostic system includes a transmitter system and a machine mounted locator located on the machine, a locating means for determining the coordinates of the machine mounted locator relative to the transmitter system, and error detection means for determining whether the coordinates of the machine mounted locator relative to the transmitter system are within programmed parameters. A second machine mounted locator mounted on the machine may also be provided. The error detection means according to a further aspect of the invention may include means for differentiating machine errors from environmental errors. The transmitter system may include one or more drivers positioned on the machine, where the drivers are in communication with a controller for transmitting a uniquely encoded signal. The error detection means according to one aspect of the invention includes an algorithm performed at the controller based on the uniquely encoded signal and a radio frequency signal generated by the machine mounted locator. The system for diagnosing errors may further include means for defining one or more safety zones around the machine, which may by dynamically altered depending upon the detected environmental conditions.

These and other features, aspect and advantages of the present invention will become clearer by reviewing the drawings and detailed description herein.

DETAILED DESCRIPTION OF PREFERRED EMBODIMENTS

For the purpose of this document, "intrinsically safe" shall be as defined by the U.S. Department of Labor, Mine Safety and Health Administration (MSHA). Further, for the purpose of this document, the various microcontrollers described herein are understood to execute software or program instructions included in or accessible by the microcontrollers in a tangible storage medium, such as random access memory (RAM), read only memory (ROM), Electrically Erasable Programmable Read-Only Memory (EEPROM), flash memory, or the equivalent.

Figure 1:
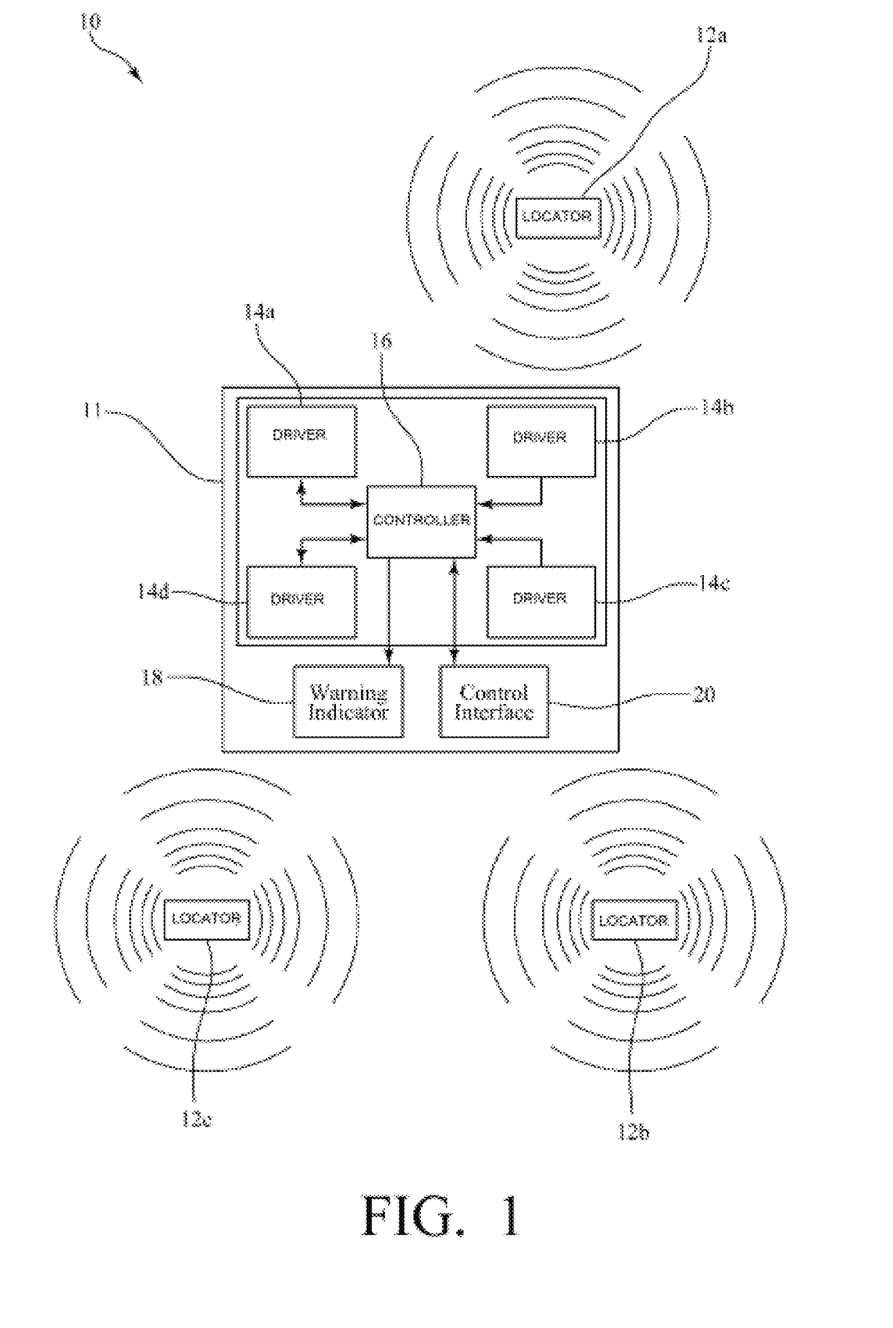
FIG. 1 is a functional block diagram of an exemplary system for proximity detection according to the invention.
Figure 2:
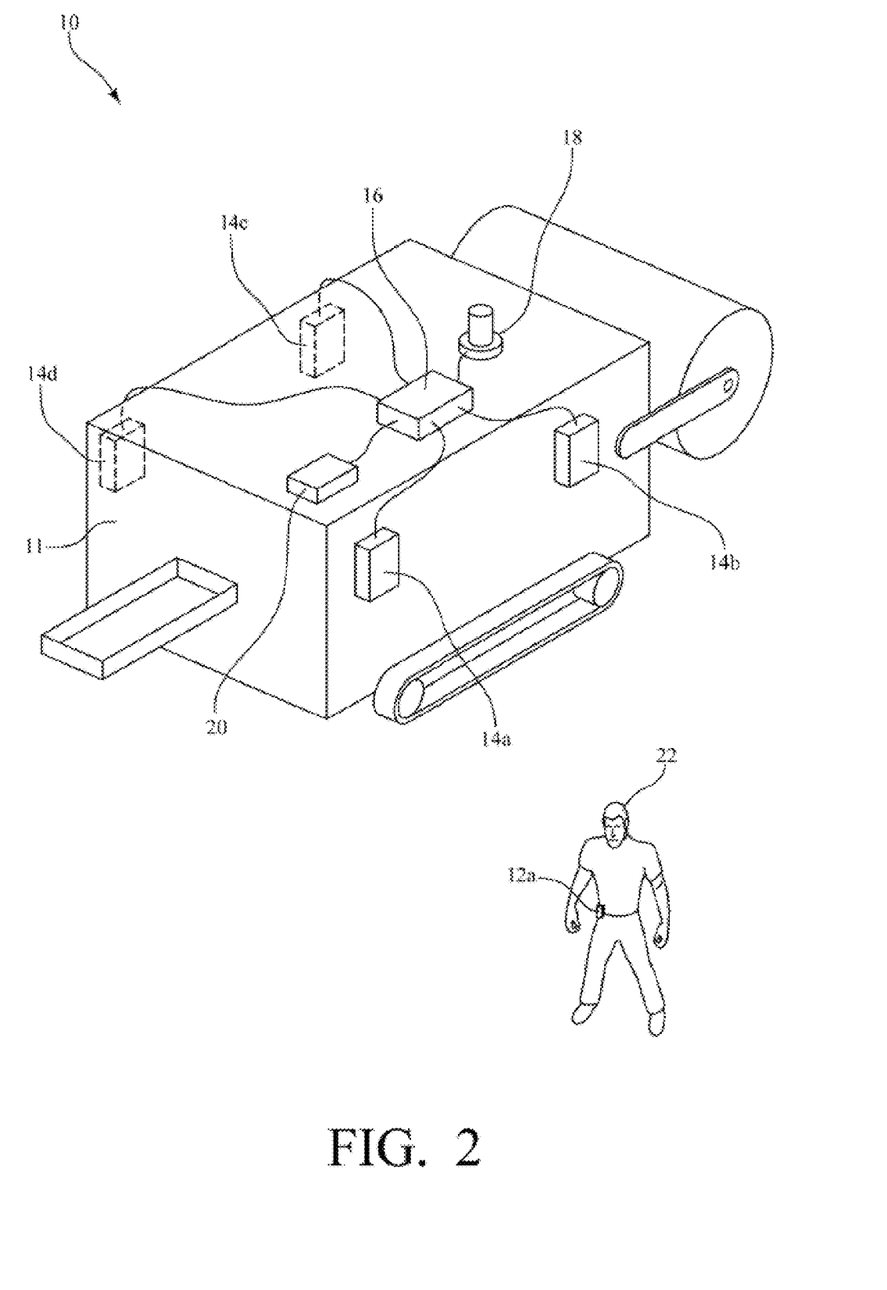
FIG. 2 is a schematic diagram of the exemplary system of claim 1.

FIG. 1 and FIG. 2 show an exemplary system 10 for detecting the proximity of a person 22 to a machine 11, including: at least a first locator 12a, a plurality of drivers 14a-14d, a controller 16, and a warning indicator or device 18. The drivers 14a-14d emit a magnetic field around the machine 11, and the locators 12a-12c respond to this magnetic field and communicate via radio frequency (RF) with the controller 16. The controller 16 performs an algorithm to determine where, in relation to the machine 11, the locators 12a-12c are positioned. When a locator, for example the first locator 12a, breaches one of the configurable zones 24, 26 created around the machine, the proper configuration action is performed.

The plurality of drivers 14a-14d and the controller 16 comprise a transmitter system. The proximity system controller 16 generates and transmits, through the plurality of drivers 14a-14d, a uniquely encoded magnetic signal, simultaneously or sequentially from each driver. The signal may be equal for all drivers or also may be unique to each driver. The controller 16 also generates and transmits a driver RF packet prior to the transmission of driver magnetic signals. The driver RF packet is transmitted from a digital radio transceiver located in the system controller 16. The driver RF packet contains parameters including: magnetic signal timing, signal duration, frequency construction, encoding, signal type, message time & date stamp, and machine serial number. This information allows the locator 12 to be synchronized with the driver 14 and search for and retrieve the signal in the presence of radio and magnetic noise.

The machine 11 also includes a control interface 20 for receiving commands to control operation of the machine 11 and for reporting an operating state of the machine 11.

The system utilizes a plurality of locators 12a-12c for being carried by a person 22 in proximity to the machine 11. Each locator, such as first locator 12a, receives the uniquely encoded magnetic proximity signal generated by the drivers 14a-14d and also receives the RF packet containing information from the machine driver RF transmission. The locator 12a processes the data from the plurality of drivers 14a-14d and the RF packet and transmits a response RF packet to the machine controller 16. The locator RF packet contains processed values from the plurality of driver received signals, driver RF packet, and processed locator data such as translated distance values from locator to each respective driver, locator serial number, message time & date stamp, locator battery status, and locator operational status.

The machine controller 16 is in communication with the plurality of driver units 14a-14d and includes or accesses data defining a first boundary around the machine 11. The processing unit 16 determines a location of the first locator unit 12a relative to the machine 11 based on the received signal strength of the magnetic proximity signal received by the locator from at least two of the plurality of driver units 14a-14d and the known location of the at least two of the plurality of driver units 14a-14d. The processing unit 16 then determines if the location of the first locator unit 12a relative to the machine 11 is within the first boundary around the machine 11 and outputs a proximity warning signal if the first locator unit 12a is within the first boundary around the machine 11.

The machine 11 includes a control interface 20 for controlling operation of the machine 11 and for reporting an operating state or operating status of the machine 11, and the controller 16 is in communication with the control interface 20. The machine 11 may be, for example, a continuous mining machine or another type of underground mining machine.

The warning device 18 is in communication with the processing unit 16 and provides at least a visual signal in response to receiving the proximity warning signal from the processing unit 16. The warning device 18 may also provides an audible signal in response to receiving the proximity warning signal from the processing unit 16. Thus, the warning device 18 may be, for example, a flashing strobe light and horn. Alternatively, the visual portion of the warning device may be incorporated into the status indicator 68 of each of the drivers 14a-14d.

Figure 3:
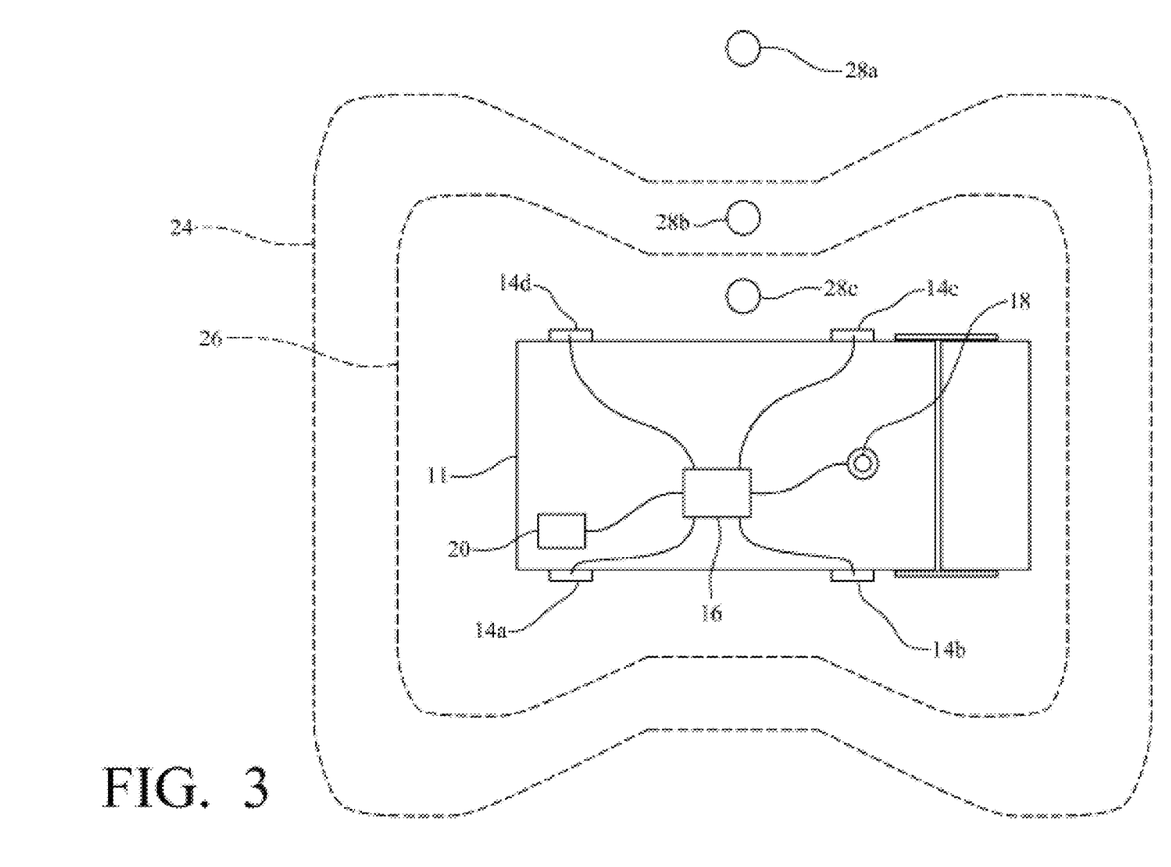
FIG. 3 is plan view showing exemplary boundaries around a machine operated with the exemplary system of FIG. 1.

FIG. 3 shows the machine 11 according to one presently preferred embodiment, including the plurality of drivers 14a-14d and a first boundary 24 around the machine 11. Advantageously, the first boundary 24 around the machine 11 can be defined to have any geometric shape. Also shown is a second boundary 26 around the machine 11. The second boundary 26 around the machine 11 is also defined by data included in or accessible by the controller 16. Thus, for example, the first boundary 24 may be considered a "warning boundary" and the second boundary 26 may considered a "operation limiting" boundary. Additional boundaries may also be defined by data accessible by the controller 16.

When the controller 16 determines the location of the first locator 12a or any other locator (e.g., second locator 12b, third locator 12c) (generally referred hereinafter as "locator 12"), the controller 16 will respond based on the determined location. Thus, for example, if the locator 12 is at a location 28a, which is outside of the first boundary 24 around the machine 11, no action would be taken. However, if the locator 12 is determined to be at a location 28b that is within the first boundary 24 around the machine 11, the warning device 18 (FIG. 1 and FIG. 2) will provide at least a visual signal indicating that the location of the locator 12 relative to the machine 11 is within the first boundary 24. Further, the controller 16 (FIG. 1 and FIG. 2) outputs a control signal to the control interface 20 (FIG. 1 and FIG. 2) to limit the operation of the machine 11 if the location of the locator is at a location 28c relative to the machine 11 is within the second boundary 26 around the machine 11.

As mentioned, the controller 16 may include data defining a plurality of boundaries around the machine 11. Then, the controller 16 may receive an operating state signal indicating the operating state of the machine 11 from the control interface 20 of the machine, select a boundary (i.e., a "selected boundary") from the plurality of boundaries around the machine 11 based on the operating state signal (i.e., different boundaries can be selected based on different operating states of the machine (e.g., mining, moving or"tramming," etc.)), and output a control signal to the control interface 20 to limit the operation of the machine 11 if the location of the locator 12 relative to the machine 11 is within the selected boundary.

Figure 4:
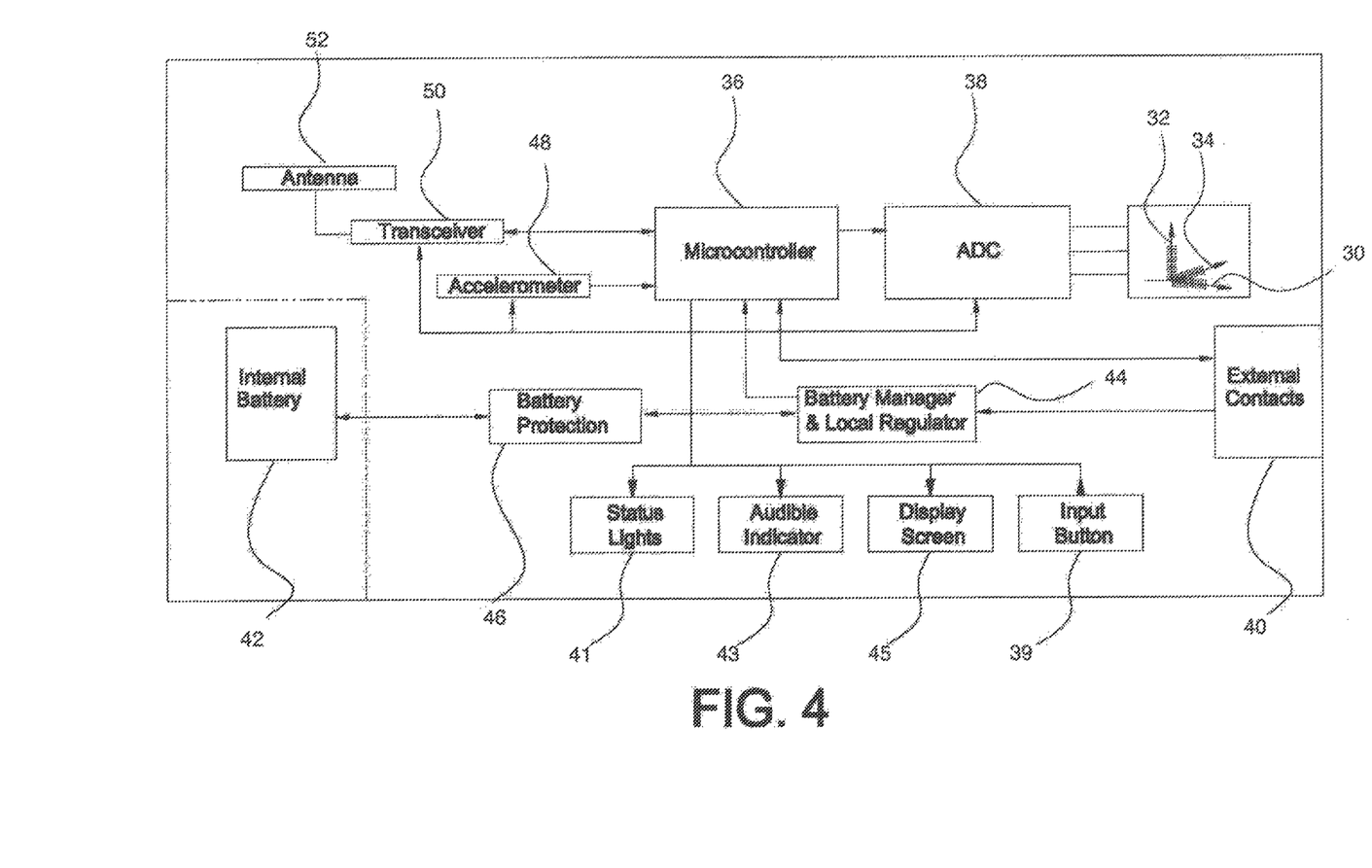
FIG. 4 is a functional block diagram of an exemplary locator of the exemplary system of FIG. 1.

FIG. 4 shows an exemplary locator 12, which is for being carried by a person. Although the drawings show only a single locator 12a, or three locators 12a, 12b, 12c, it is anticipated and understood that any number of locators 12 can be used. The locator unit 12 comprises a locator microcontroller 36 for processing data and controlling locator functions, and a first magnetic proximity signal receiving coil 30 for receiving the magnetic proximity signal. The first locator unit may further comprise: a second magnetic proximity signal receiving coil 32 in communication with the locator microcontroller 36 and oriented orthogonally to the first magnetic proximity signal receiving coil 30; a third magnetic proximity signal receiving coil 34 in communication with the locator microcontroller 36 and oriented orthogonally to the first magnetic proximity signal receiving coil 30 and to the second magnetic proximity signal receiving coil 32; and an accelerometer 48 in communication with the locator, the accelerometer measuring a direction of gravity.

The locator microcontroller 36 receives from all coils 30, 32, 34 the magnetic proximity signal and then may process the signals in any combination, mathematically processed or raw, from individual or multiple coils. The locator 12 may also select a most appropriate single coil signal based on the direction of gravity. The output from the coil or coils then passes through an analog to digital converter 38 before being received by the microcontroller 36 and/or transceiver 50.

The locator also contains a digital radio transceiver 50 receiving and transmitting RF packets by way of antenna 52. The locator microprocessor 36 receives the driver RF packet containing synchronization, frequency construction, encoding, and signal type information. This information allows the locator 12 to be synchronized with the driver 14 and search for and retrieve the magnetic signal in the presence of radio and magnetic noise.

The locator microcontroller 36 processes the data from the plurality of drivers 14a-14d and the driver RF packet and transmits a locator RF packet to the machine controller 16. The locator RF packet contains processed values from the plurality of driver received signals, driver RF packet, and processed locator data such as translated distance values from locator to each respective driver, locator serial number, message time & date stamp, locator battery status, and locator operational status.

The exemplary locator 12 is preferably contained in a dust proof enclosure that passes both the magnetic proximity signal and a digital radio transmission. The enclosure may be mechanically keyed to match a locator charging station (not shown), and includes external contacts 40 for making electrical contact with the transmitter charging station. When the locator 12 is inserted into the charging station, the external contacts 40 provide a safe means of charging an internal battery 42 and digitally communicating with the locator microcontroller 36. The digital communications may be used to perform functional integrity test on the locator and locator battery to ensure proper locator operation prior to field use. Also, preferably, the locator 12 is intrinsically safe.

Charging current is controlled by a battery manager and local regulator circuit 44. The internal battery 42 is connected to the battery manager and local regulator circuit 44 through a battery protection circuit 46. The battery protection circuit 46 protects the battery from overcharge, over discharge, and over current conditions. The battery manager and local regulator circuit 44 feeds power to the transmitter microcontroller 36 and the coil driver circuit 38. It is noted that the functionality of the battery manager and local regulator circuit 44 can be accomplished by other circuit configurations without departing from the spirit or the scope of the invention as claimed hereinafter.

The exemplary locator 12 also includes means for accepting input from and displaying information to the person 22. Specifically, an input button 39 which is in communication with the microcontroller 38 may be provided to accept input from the person 22. Status lights 41, an audible indicator 43 and/or a display screen 45 may also be provided in communication with the microcontroller 38 to provide information to the person 22. The display screen 45 may further comprise a touch-screen type device that is capable of both displaying information to the person 22 and accepting input from the person 22.

Figure 5:
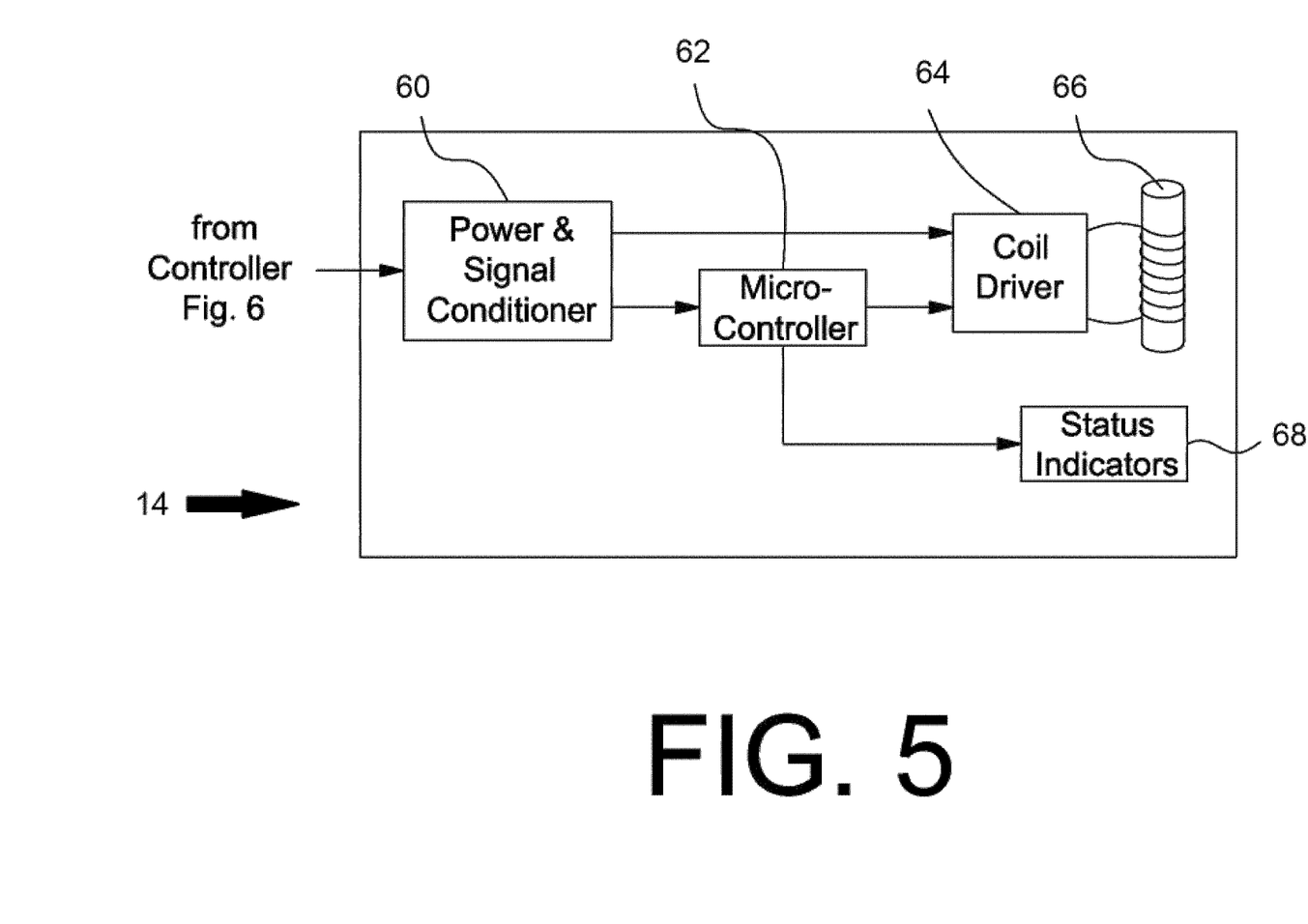
FIG. 5 is a functional block diagram of an exemplary driver of the exemplary system of FIG. 1.

FIG. 5 shows an exemplary driver 14 including a power and signal conditioner 60, microcontroller 62, coil driver 64, coil 66 and status indicators 68. A magnetic proximity signal is generated by the controller 16 and passed on to the driver(s) 14. The magnetic proximity signal is passes through a power and signal conditioner 60 to prepare it for transmission. The signal is then transmitted to the driver microprocessor 62 for further enhancement of modification. Alternatively, if no further enhancement or modification is required, the signal can be passed directly to the coil driver 64. Both the signal conditioner 60 and microcontroller 62 are in communication with the magnetic proximity transmitting coil 66 through the coil driver 64. Lighted status indicators 68 are in communication with the driver microcontroller 62, and are externally visible to indicate to the operator that a magnetic proximity signal is being transmitted by the driver 14.

The exemplary driver 14 is contained in an enclosure that is strong enough to be machine mounted and survive in a mining environment, but still pass the magnetic proximity signal. Preferably, the enclosure (not shown) has at least one window to allow status lights to be visible externally.

Figure 6:
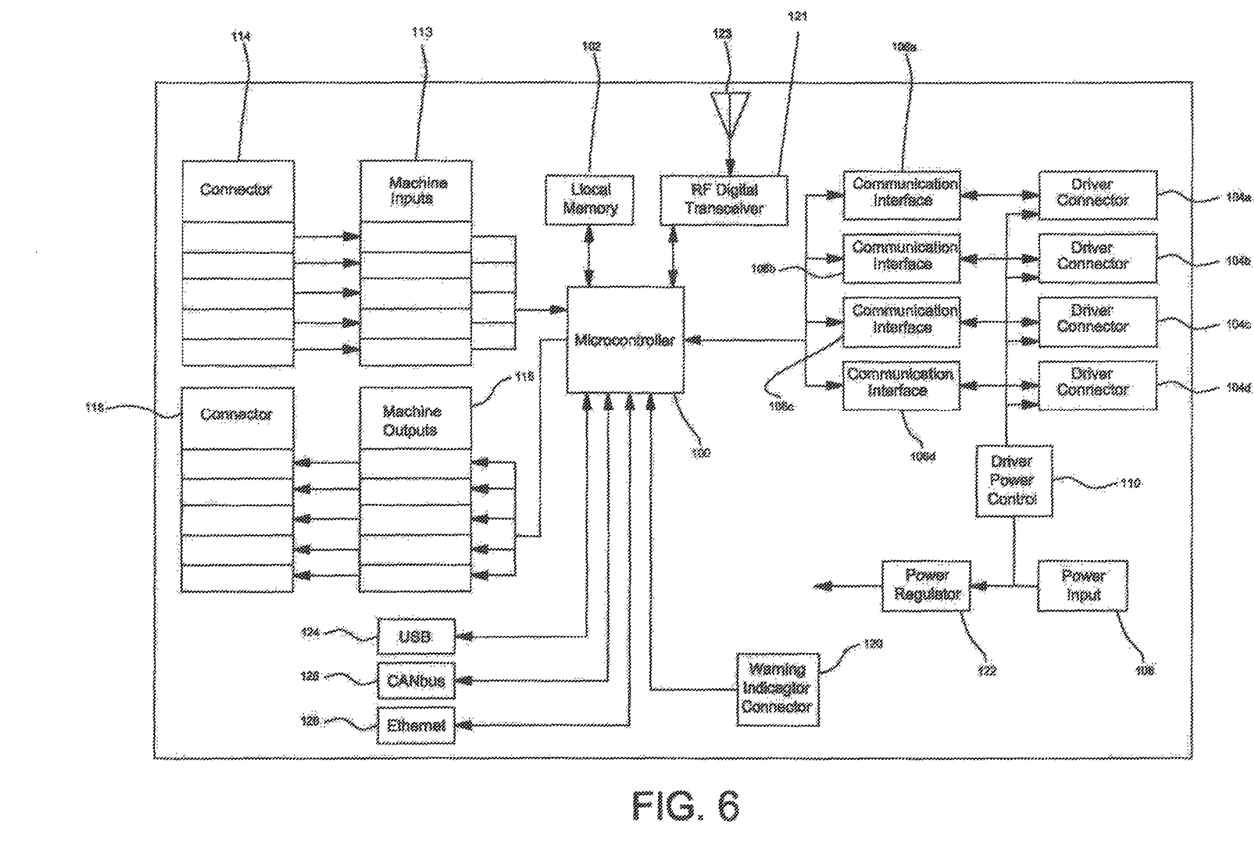
FIG. 6 is a functional block diagram of an exemplary controller of the exemplary system of FIG. 1.

FIG. 6 shows an exemplary controller 16 including a processing unit microcontroller 100 and a non-volatile storage medium 102. The controller microcontroller 100 is in communication with a plurality of driver connectors 104a-104d through a plurality of communication interfaces 106a-106d. Each of the plurality of driver connectors 104a-104d is in communication with a respective one of the drivers 14a-14d (FIG. 1 and FIG. 2).

The exemplary controller 16 receives power from the machine via a power input 108. A receiver power controller 110 is in communication with the power input 108 and preferably provides intrinsically safe power to the plurality of drivers 14a-14d (FIG. 1 and FIG. 2) via the plurality of driver connectors 104a-104d. The plurality of communication interfaces 106a-106d also preferably makes communication between the controller microcontroller 100 and the plurality of drivers 14a-14d (FIG. 1 and FIG. 2) intrinsically safe. However, it is noted that the principals taught herein are not limited to configurations requiring intrinsically safe power, but apply generally to equivalent non-intrinsically safe configurations. Preferably, the exemplary controller 16 is housed in an explosion proof enclosure.

Also shown are machine inputs 113, machine input connectors 114, machine outputs 116 and machine output connectors 118, which cooperate with the control interface 20 of the machine 11 (FIG. 1 and FIG. 2) for receiving the operating state signal indicating the operating state of the machine 11 and outputting a control signal to the control interface 20 of the machine 11. Additional input/output to the controller microcontroller 100 are provided by USB 124, CANbus 125 and Ethernet 126 connectors.

Still further, the controller microcontroller 100 is in communication with a warning indicator connector 120 for outputting the proximity warning signal. A power regulator 122 is in communication with the power input 108 and provides power to the exemplary controller 16.

The controller 16 further includes a digital radio transceiver 121 and digital radio antenna 123. One or more antennas 123 may be used as needed. The antenna 123 is shown in FIG. 6 as being internal to the housing of the controller 16. Alternatively, the system may utilize one or more antennas that can be mounted externally to the controller 16. The transceiver 121 is in communication with the microcontroller 100 for receiving and processing the RF packet from the locator(s) 12, which contains processed values from one or more of the plurality of driver received signals, driver RF packet, and processed locator data such as translated distance values from locator to each respective driver, locator serial number, message time & date stamp, locator battery status, and locator operational status.

The controller 16 further may use the microcontroller 100 to process data packets for use by remote monitoring and control systems. These packets may be transmitted via the digital radio transceiver 121 and digital radio antenna 123 for receipt by external systems. Further, the controller 16 may use the microcontroller 100 to process data packets transmitted from a remote system and received via the digital radio transceiver 121 and digital radio antenna 123.

Figure 7:
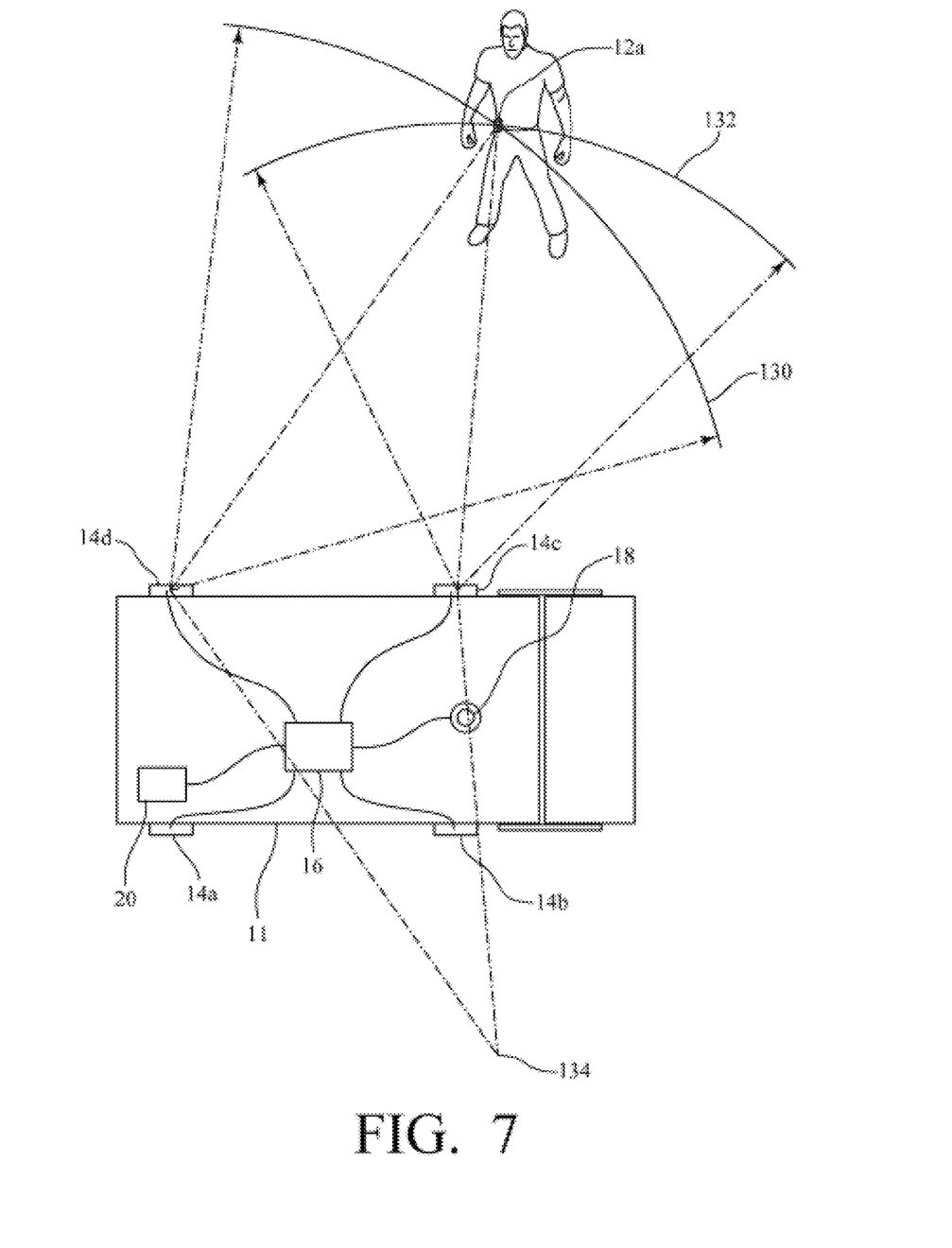
FIG. 7 is a schematic diagram of an operator in proximity to a machine whose location is determined using two of a plurality of the drivers.

For example, in one exemplary methodology for determining the position of the locator(s), as shown in FIG. 7, for each RF transmission by the transceiver 50 of the locator(s) 12, the controller 16 will receive a distance value from at least two of the plurality of drivers 14a-14d. The controller 16 then selects the two drivers (e.g., two of drivers 14a-14d) with the lowest distance values, or drivers 14c and 14d in the example. Given the known locations of the drivers 14c, 14d mounted on the machine 11, an arc of distance 130, 132 from each driver 14c, 14d is determined. The two arcs 130, 132 will intersect in two places. The location that is to the exterior of the machine 11 is the correct location. The second location 134 is dismissed since it is not to the exterior of the machine 11 with reference to the drivers 14c, 14d, and because the second location 134 would also be closer to the other drivers 14a, 14b if this was the real location.

One of skill in the art will recognize that other equivalent methodologies for determining the position(s) of the locator(s) are possible within the spirit and scope of the invention as claimed hereinafter. Such methodologies may utilize more than two drivers to perform the locating function and calculation. Similarly, in some configurations, only a single driver may be used to perform the locating function and calculation.

Figure 8:
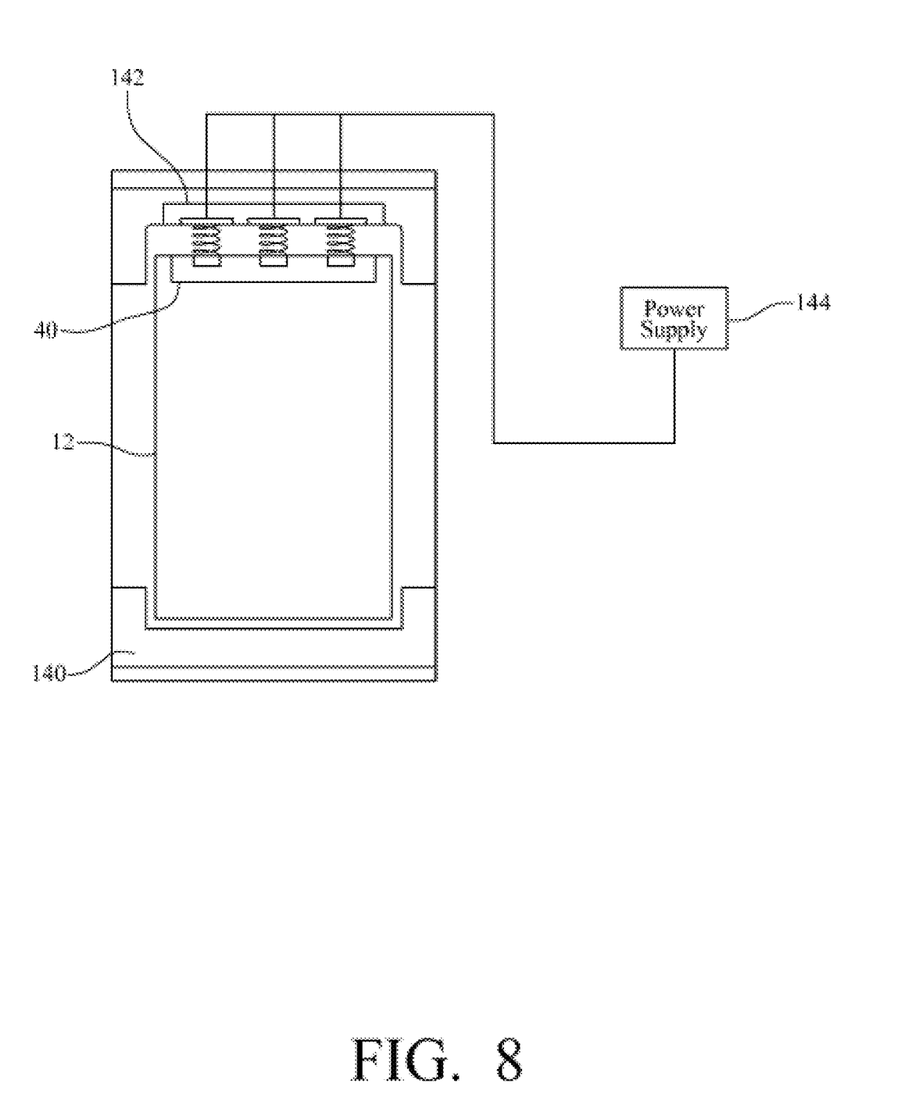
FIG. 8 is a schematic diagram of an exemplary locator positioned in an exemplary charger unit.

FIG. 8 shows an exemplary locator 12 positioned in an exemplary charger unit 140. The external context 40 of the exemplary locator 12 are biased against a set of charging contacts 142 of the charger 140, which are supplied with power from a power supply 144. Additionally, although not shown, a communication with the locator microcontroller 36 may also be made through the external context 40 of the locator 12 and the charger context 142 of the charger 140.

Figure 9:
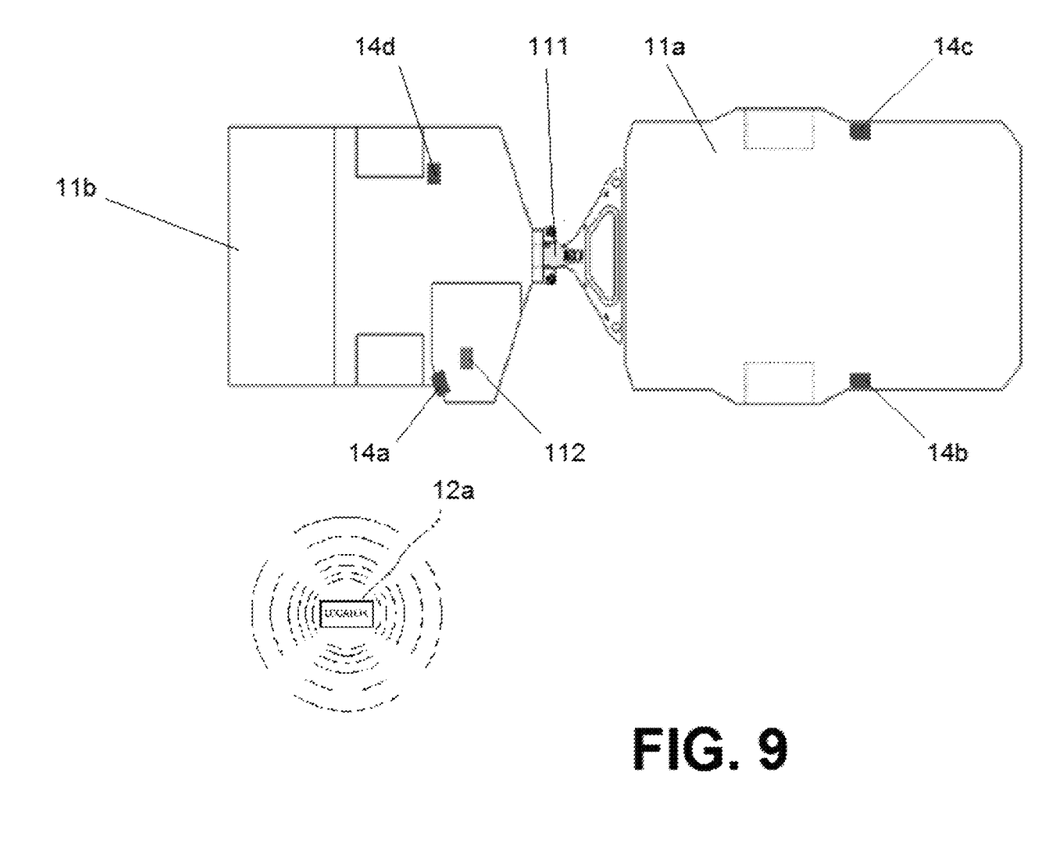
FIG. 9 is a top plan view showing an alternative embodiment of the system for proximity detection in use on an articulating machine.

FIG. 9 shows an alternative embodiment of the system for proximity detection in use on an articulating machine having a front section 11a and a rear section 11b connected at an articulation point 111. As in the embodiment shown in FIGS. 1-8, a plurality of drivers 14a-14d are positioned on the machine. According to the particular embodiment shown in FIG. 9, first and second drivers 14b, 14c are located on the front section 11a of the machine, and third and fourth drivers 14a, 14d are located on the rear section 11b of the machine. The remaining components (e.g. controller 16, warning indicator 18, and control interface 20) of the system for proximity detection according to this embodiment are the same as in the embodiment shown in FIGS. 1-8, and are not shown here for convenience.

The addition of a machine mounted locator 112 at a known fixed position on the rear section 11b of the machine allows for the calculation of the angle at the articulation point 111 when the machine articulates. With this data, an algorithm that has been updated to utilize the position of the machine mounted locator 112 can be used to determine the location of an external locator 12a. Specifically, the new position of the drivers 14a, 14d associated with the rear section 11b of the machine is used, within the current tracking algorithm, to calculate the position of locator 12a, relative to the machine. This configuration is specifically for articulating machinery and not all equipment will need the machine mounted locator 112. Although the machine mounted locator 112 is shown in FIG. 9 as being positioned on the rear section 11b of the articulating machine, it could also be located on the front section 11a without departing from the scope of the present invention.

Figure 10:
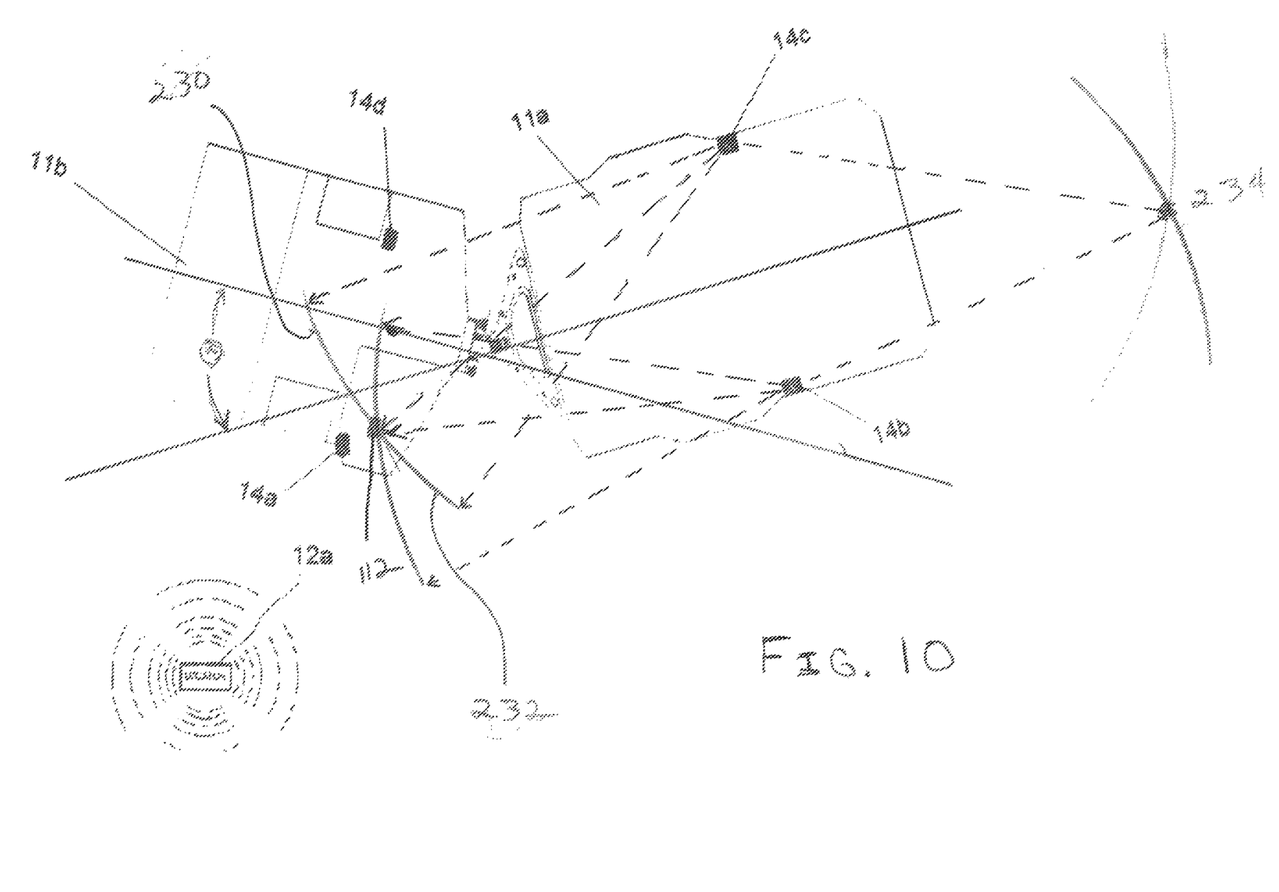
FIG. 10 is a schematic diagram of the alternative embodiment shown in FIG. 9 illustrating how the angle of articulation is determined.

As best shown in FIG. 10, the methodology for determining the position of the machine mounted locator 112 is exactly the same as the methodology for determining the position of the mobile locator 12a, as shown in FIG. 7. For each RF transmission by the transceiver 50 of the machine mounted locator 112, the controller 16 will receive a distance value from the drivers 14b, 14c located on the front section 11a of the articulating machine 11. Because the locations of the drivers 14a, 14b on the rear section 11b of the articulating machine 11 are fixed relative to the machine mounted locator 112 which is also mounted on the rear section 11b, we are not concerned with the distances as they are fixed. Given the known locations of the drivers 14b, 14c mounted on the front section 11a of the articulating machine 11, an arc of distance 230, 232 from each driver 14b, 14c is determined. The two arcs 230, 232 will intersect in two places. The location that is in the direction of the rear section 11b of the machine 11 is the correct location. The second location 134 is dismissed since it is not in the direction of the rear section 11b where the machine mounted locator 112 is known to be positioned. Using simple geometry, the angle of articulation θ can be calculated.

Once established, the zones, or boundaries 24, 26 (FIG. 3) around the machine 11 may change dynamically based on machine 11 feedback to the controller 16. The size and location of the zones may change based on the machine 11 moving or stationary, the speed of the machine, the articulation angle, etc. This is particularly important for the articulating machine embodiment shown in FIG. 9.

The machine mounted locator 112 may also be utilized as a diagnostic tool to detect and diagnose faults in the various components of the system, including, but not limited to magnetic and RF components. For instance, where the distance between driver units 14a, 14d on the rear section 11b of the articulating machine and the machine mounted locator 112 is fixed and known, anomalous readings that would indicate the driver unit 14a, 14d is closer or further than a specified, programmed buffer range would suggest that the driver unit, or the machine mounted locator is malfunctioning. Various algorithms can be programmed into the controller to assess what the malfunction is based on the data received. The machine mounted locator 112 may be used to provide diagnostic information for other components, including RF transmissions between components in the same manner.

The machine mounted locater 112 may also be used to diagnose certain environmental conditions, such as ferrous objects in the environment (i.e. hog panels and/or metal mesh on the ceiling to hold back loose earth), and take appropriate action to compensate for such conditions. This would also apply where absorbing and/or reflective material is present in the environment that would distort the magnetic and/or RF signals. To detect such environmental conditions, the machine mounted locator 112 would be programmed with a certain threshold with regard to the parameters of a magnetic signal and/or RF signal. If there is a change beyond the threshold, it may suggest a hazardous environmental condition that would require the warning zones to be adjusted to compensate for the condition. The magnitude of change is the difference between the environment and the machine.

To better distinguish environmental conditions from machine conditions, two machine mounted locators 112 could be mounted on the machine. If both machine mounted locators are detecting the same anomaly, it is likely an environmental condition, whereas an anomaly in only one machine mounted locator would strongly suggest a machine condition. This could also be applied to detect problems when inconsistent information is received from a remote locator. If two RF antennas are located on the controller, it would be expected that packets on both antennas would be received at the same rate, for example 10 times per second. If there is a significant difference between the rates for the two antennas, it may be due to environmental conditions such as one of the locators being occluded.

One of ordinary skill in the art will recognize that additional steps and configurations are possible without departing from the teachings of the invention. Although the preferred embodiments of the present invention describe and utilize magnetics data to calculate the location of the person or second machine, other similar distance measurement data from a variety of sensors may be used to obtain similar results. One such alternative to magnetics data would be to utilize radio waves to calculate the location of the person or second machine. Such radio wave technologies as RAdio Detection And Ranging (RADAR) or Radio Frequency IDentification (RFID) may be used within the spirit and scope of the present invention. Similarly, laser light based remote sensing technologies such as LIght Detection And Ranging (LIDAR) may also be used to as a substitute for magnetics data. Other equivalent technologies for remote sensing will be apparent to those of skill in the art.

This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

We claim:

1. A system for detecting the angle of articulation at an articulating point between a first section and a second section of an articulating machine comprising:
   a controller positioned on the articulating machine for generating a uniquely encoded signal;
   a plurality of drivers positioned on the second section of the articulating machine, said drivers being in communication with said controller for transmitting said uniquely encoded signal;
   a machine mounted locator positioned on the first section of the articulating machine, said machine mounted locator being in communication with said drivers; and
   means for determining the angle of articulation between the first section and second section of the articulating machine at the articulating point, and based on the determined angle, outputting the determined angle for the articulating machine;
   wherein said means for determining the angle of articulation includes an algorithm performed at the controller based on the uniquely encoded signal and a radio frequency signal generated by the machine mounted locator.

2. The system for detecting the angle of articulation of claim 1, further comprising one or more drivers positioned on the first section of the articulating machine, said drivers being in communication with said controller for transmitting said uniquely encoded signal.

3. The system for detecting the angle of articulation of claim 1 further comprising means for defining one or more safety zones around the articulating machine.

4. The system for detecting the angle of articulation of claim 3 wherein said one or more safety zones comprise a first warning boundary zone and a second operation limiting boundary zone.

5. The system for detecting the angle of articulation of claim 3 further comprising means for dynamically altering said one or more safety zones.

6. The system for detecting the angle of articulation of claim 5 wherein said one or more safety zones are dynamically altered depending upon the articulation angle.

7. The system for detecting the angle of articulation of claim 1 wherein the uniquely encoded signal is a magnetic signal.

8. The system for detecting the angle of articulation of claim 1 further including a digital radio transceiver located in the controller, and wherein the controller also generates a driver radio frequency signal and the digital radio transceiver transmits said driver radio frequency signal.

9. The system for detecting the angle of articulation of claim 8 wherein the encoded signal is a uniquely encoded magnetic signal and the machine mounted locator comprises:
   a locator microcontroller for processing data and controlling locator functions;
   one or more magnetic proximity signal receiving coils in communication with the locator microprocessor for receiving the uniquely encoded magnetic signal;
   a digital radio transceiver in communication with the locator microcontroller for receiving said driver magnetic frequency signal and transmitting a locator radio frequency signal.

10. The system for detecting the angle of articulation of claim 9, wherein the one or more magnetic proximity receiving coils comprises:
   a first magnetic proximity signal receiving coil;
   a second magnetic proximity signal receiving coil oriented orthogonally to the first magnetic proximity signal receiving coil; and
   a third magnetic proximity signal receiving coil oriented orthogonally to the first magnetic proximity signal receiving coil and to the second magnetic proximity signal receiving coil.

* * * * *